(12) United States Patent
Kusakabe et al.

(10) Patent No.: US 11,703,021 B2
(45) Date of Patent: Jul. 18, 2023

(54) FUEL INJECTION DEVICE

(71) Applicant: Hitachi Automotive Systems, Ltd., Hitachinaka (JP)

(72) Inventors: Ryo Kusakabe, Hitachinaka (JP); Motoyuki Abe, Mito (JP); Tohru Ishikawa, Kitaibaraki (JP); Noriyuki Maekawa, Kashiwa (JP); Masahiro Soma, Hitachi (JP); Takao Miyake, Hitachinaka (JP); Yasuo Namaizawa, Naka (JP)

(73) Assignee: Hitachi Astemo, Ltd., Hitachinaka (JP)

( * ) Notice: Subject to any disclaimer, the term of this patent is extended or adjusted under 35 U.S.C. 154(b) by 0 days.

(21) Appl. No.: 17/352,665

(22) Filed: Jun. 21, 2021

(65) Prior Publication Data

US 2021/0310452 A1     Oct. 7, 2021

Related U.S. Application Data

(63) Continuation of application No. 13/415,960, filed on Mar. 9, 2012, now Pat. No. 11,067,045.

(30) Foreign Application Priority Data

Mar. 10, 2011   (JP) .................................. 2011-052347

(51) Int. Cl.
*F02M 51/06* (2006.01)
*F02M 61/16* (2006.01)
(Continued)

(52) U.S. Cl.
CPC ...... *F02M 51/061* (2013.01); *F02M 51/0614* (2013.01); *F02M 51/0664* (2013.01);
(Continued)

(58) Field of Classification Search
CPC ............. F02M 51/061; F02M 51/0614; F02M 51/0664; F02M 51/0621; F02M 51/0635; F02M 51/0685; H01F 7/1638
See application file for complete search history.

(56) References Cited

U.S. PATENT DOCUMENTS 4,030,668 A     6/1977  Kiwior
4,423,361 A *  12/1983  Stenudd ................ H01F 7/1638
                                                        318/135
(Continued)

FOREIGN PATENT DOCUMENTS

DE      2452301 A1 *  5/1976  ......... F02M 51/0621
EP       903472 A2 *  3/1999  ................ F01L 9/04
(Continued)

OTHER PUBLICATIONS

Extended European Search Report dated Jun. 4, 2012 (five (5) pages).
(Continued)

*Primary Examiner* — Logan M Kraft
*Assistant Examiner* — Joshua Campbell
(74) *Attorney, Agent, or Firm* — Crowell & Moring LLP (57) ABSTRACT

In a fuel injection device, a driving unit structure has a magnetic aperture, in which an inner diameter is gradually enlarged toward the mover side, provided in an inner peripheral surface of the magnetic core. It is possible to reduce magnetic delay time upon valve opening from the supply of the electric current to the coil to the rise of magnetic flux and magnetic delay time upon valve closing from the stoppage of the electric current to the coil to reduction of magnetic flux, by providing a magnetic aperture in the inner peripheral surface of the magnetic core. Thus it is possible to improve the dynamic responsiveness upon valve opening and valve closing.

20 Claims, 9 Drawing Sheets

(51) Int. Cl.
  *F02M 51/02* (2006.01)
  *H01F 7/16* (2006.01)
  *H02K 3/04* (2006.01)
  *F02M 47/02* (2006.01)
  *F02M 51/00* (2006.01)

(52) U.S. Cl.
  CPC ........ *F02M 51/0685* (2013.01); *F02M 61/16* (2013.01); *F02M 47/027* (2013.01); *F02M 51/00* (2013.01); *F02M 51/02* (2013.01); *F02M 51/0621* (2013.01); *F02M 51/0628* (2013.01); *F02M 51/0635* (2013.01); *H01F 7/1638* (2013.01); *H01F 7/1646* (2013.01); *H02K 3/04* (2013.01)

(56) References Cited

U.S. PATENT DOCUMENTS

| | | | |
|---|---|---|---|
| 4,554,901 A | 11/1985 | Gibson | |
| 4,676,478 A | 6/1987 | Kiuchi | |
| 4,832,314 A * | 5/1989 | Trott | F02M 51/08 239/585.3 |
| 4,957,275 A | 9/1990 | Homes | |
| 4,984,549 A | 1/1991 | Mesenich | |
| 5,076,499 A * | 12/1991 | Cranford | F02M 51/0685 251/129.14 |
| 5,538,219 A | 7/1996 | Osterbrink | |
| 5,673,669 A | 10/1997 | Maley et al. | |
| 5,897,098 A | 4/1999 | Nishinosono et al. | |
| 6,032,879 A | 3/2000 | Hamada et al. | |
| 6,076,550 A | 6/2000 | Hiraishi et al. | |
| 6,220,275 B1 | 4/2001 | Nishinosono | |
| 6,450,155 B1 | 9/2002 | Arkfeld | |
| 6,450,424 B1 | 9/2002 | Horbelt | |
| 6,494,389 B1 | 12/2002 | Reiter | |
| 6,510,841 B1 | 1/2003 | Stier | |
| 6,682,046 B2 | 1/2004 | Mimura et al. | |
| 6,808,133 B1 | 10/2004 | Stier | |
| 7,021,568 B2 | 4/2006 | Rieger et al. | |
| 7,344,093 B2 | 3/2008 | Yamamoto et al. | |
| 7,775,463 B2 | 8/2010 | Abe | |
| 7,874,070 B2 | 1/2011 | Gunji | |
| 8,230,839 B2 | 7/2012 | Hayatani et al. | |
| 2003/0025007 A1 | 2/2003 | Brooks et al. | |
| 2005/0140480 A1* | 6/2005 | Yamamoto | F02M 51/0682 335/220 |
| 2006/0163390 A1 | 7/2006 | Ruehle et al. | |
| 2006/0192035 A1 | 8/2006 | Petrone et al. | |
| 2007/0194151 A1 | 8/2007 | Hayatani | |
| 2008/0011886 A1* | 1/2008 | Abe | H01F 7/081 239/585.1 |
| 2008/0149744 A1 | 6/2008 | Mueller | |
| 2008/0237520 A1 | 10/2008 | Sugiyama | |
| 2009/0200405 A1 | 8/2009 | Yoshimaru et al. | |
| 2010/0012754 A1* | 1/2010 | Hayatani | F02M 51/0685 239/585.5 |
| 2010/0018503 A1 | 1/2010 | Perry | |
| 2010/0065021 A1* | 3/2010 | Hayatani | F02M 51/0685 239/585.5 |
| 2011/0057059 A1 | 3/2011 | Yamamoto et al. | |

FOREIGN PATENT DOCUMENTS

| | | |
|---|---|---|
| EP | 1 617 071 A1 | 1/2006 |
| EP | 1 820 959 A1 | 8/2007 |
| EP | 2 249 022 A1 | 11/2010 |
| EP | 2 574 768 A1 | 4/2013 |
| JP | 35-21063 | 8/1960 |
| JP | 59-25072 A | 2/1984 |
| JP | 59-43668 U | 3/1984 |
| JP | 63-90067 U | 6/1988 |
| JP | 64-66465 A | 3/1989 |
| JP | 9-69432 A | 3/1997 |
| JP | 10-196486 A | 7/1998 |
| JP | 2000-277327 A | 10/2000 |
| JP | 2002-327661 A | 11/2002 |
| JP | 2003-504558 A | 2/2003 |
| JP | 2004-316521 A | 11/2004 |
| JP | 2005-163712 A | 6/2005 |
| JP | 2005-207412 A | 8/2005 |
| JP | 2005-351203 A | 12/2005 |
| JP | 2006-509141 A | 3/2006 |
| JP | 2008-31853 A | 2/2008 |
| JP | 2008-121679 A | 5/2008 |
| JP | 2010-84552 A | 4/2010 |
| JP | 2010-159677 A | 7/2010 |
| JP | 2010-229997 A | 10/2010 |
| WO | WO 97/09727 A1 | 3/1997 |
| WO | WO 2008/038396 A1 | 4/2008 |

OTHER PUBLICATIONS

Japanese-language Office Action with partial English translation dated Apr. 26, 2013 (8 pages).
Japanese Office Action with partial English translation dated Jan. 14, 2014 (eleven (11) pages).
Japanese Office Action dated Feb. 3, 2015 with English translation (six pages).
Extended European Search Report issued in counterpart European Patent Application No. 15156191.7 dated Jul. 20, 2015 (Six (6) pages).
Japanese-language Office Action issued in counterpart Japanese Application No. 2014-88696 dated May 24, 2016 with English translation (16 pages).
Japanese-language Notification of reasons for rescission issued in counterpart Japanese Application No. 2015-229270 (Japanese Patent No. 6151336) dated Nov. 13, 2018 with English translation (48 pages).
Japanese-language Office Action issued in counterpart Japanese Application No. 2017-100540 dated Aug. 25, 2017 with English translation (seven (7) pages).

* cited by examiner

ENLARGED VIEW C

FIG. 4

ENLARGED VIEW A

ENLARGED VIEW B

FIG. 7

ENLARGED VIEW E

ENLARGED VIEW D

ENLARGED VIEW F

FUEL INJECTION DEVICE

CROSS REFERENCE TO RELATED APPLICATIONS

The present application is a continuation of U.S. patent application Ser. No. 13/415,960, filed Mar. 9, 2012, the entire disclosure of which is hereby incorporated by reference into this application and which claims priority from Japanese Patent Application No. 2011-52347, filed on Mar. 10, 2011, the entire disclosure of which is also hereby incorporated by reference into this application.

TECHNICAL FIELD

The present invention relates to a fuel injection device used in e.g. an internal combustion engine.

BACKGROUND ART

For example, Japanese Patent Laid-open No. 2005-207412 (PTL 1) discloses a fuel injection valve with improved attraction force between a stationary core and a movable core. In PTL 1, the stationary core has a large diameter part in which the outer diameter on the opposite side to an end surface side facing the movable core is larger than the outer diameter of the movable core, the end surface side of the stationary core is fallen inside from the large diameter part in a radial direction of the stationary core, and as a result, the outer diameter of the opposing end surface, which faces the movable core, of the stationary core is smaller than the outer diameter of the large diameter part. With this arrangement, the area of the opposing end surface of the stationary core confronting a magnetic member set on the outer periphery of the movable core is reduced, and reduction of magnetic flux flowing between the stationary core and the movable core is mitigated, thereby improving the attraction force.

CITATION LIST

Patent Literature

[PTL 1] Japanese Patent Laid-open No. 2005-207412 (Corresponding US Patent Publication: U.S. Pat. No. 7,344,093)

SUMMARY OF INVENTION

Technical Problem

As a factor to determine responsiveness of dynamic attraction force of a mover (movable core), an excess current which occurs in a magnetic circuit is given. The excess current occurs in a direction to cancel a magnetic flux caused by supplying an electric current to a coil. It also occurs upon stoppage of current supply to the coil in a direction opposite to the direction to cancel the magnetic flux. The excess current always occurs in a direction to disturb the change of a magnetic field. In an electromagnetic type fuel injection device, magnetic delay occurs between electric current supply to the coil and rise of attraction force by the occurrence of magnetic flux and between the stoppage of electric current supply to the coil and the reduction of the attraction force by the reduction of the magnetic flux. For example, as in the case of the fuel injection valve (fuel injection device) described in PTL 1, when the outer diameter of the stationary core on the side opposite to the mover is larger than the outer diameter of the mover, the cross-sectional area of the magnetic path of the stationary core is increased, and the attraction force is improved. On the other hand, there is a probability of increment in magnetic delay time from the electric current supply to the coil to the rise of magnetic flux and increment in magnetic delay time from the stoppage of electric current supply to the coil to breakage of the magnetic flux, due to increment in the sectional area of the magnetic path. In the fuel injection valve described in PTL 1, the consideration to excess current which determines the dynamic responsiveness is not sufficient.

The present invention has an object to solve the above-described problems and provide a fuel injection device having excellent dynamic responsiveness.

Solution to Problem

In the present invention, a magnetic aperture in which an inner diameter is increased toward the mover side is provided in an inner peripheral surface of a magnetic core (stationary core).

In a fuel injection device using an electromagnet, when an electric current is supplied to a coil, magnetization starts from the outer peripheral surface side of the magnetic core positioned in the vicinity (on the inner peripheral surface side) of the coil by the influence of an excess current, and the magnetization progresses toward the inner peripheral surface side of the magnetic core away from the coil. On the other hand, when the electric current supply to the coil is stopped, demagnetization starts from the outer peripheral surface side of the magnetic core close to the coil. In the present invention, in the magnetic core, when the thickness of the mover side end surface is reduced on the inner diameter side, i.e., when the magnetic aperture in which the inner diameter is increased toward the mover side is provided in the inner peripheral surface of the magnetic core (stationary core), it is possible to reduce the magnetic delay time from the electric current supply to the coil to the rise of magnetic flux upon valve opening and the magnetic delay time from the stoppage of the electric current supply to the coil to the reduction of the magnetic flux upon valve closing, and to improve dynamic responsiveness upon valve opening and valve closing.

Further, it is preferable that the outer diameter of the magnetic core (stationary core) is larger than an inner diameter of a nozzle holder to cover the outer periphery of the mover. With this arrangement, it is possible to reduce magnetic resistance of the magnetic core and to improve the magnetic flux density of an attraction surface, and further to improve the magnetic attraction force.

More particularly, the following structures are preferably provided.

(1) A fuel injection device comprising: a valve body that comes into contact with a valve seat, to close a fuel passage, and moves away from the valve seat, to open the fuel passage; a mover that performs valve opening and closing operations in collaboration with the valve body; and a magnetic core that is excited by energization of a coil and that generates a magnetic force to drive the mover, wherein the magnetic core has a hole that is opened in an end surface opposite to the mover and formed in a direction along a valve stem, and wherein the hole has an inner diameter enlarged part, in which an inner diameter is gradually enlarged from a back side of the hole toward the end surface, in an opening part to the end surface, further wherein an interval between a surface where the inner diameter enlarged part is formed and the mover in the direction along the valve stem is increased from the end surface of the magnetic core toward the back side of the hole.

(2) In (1), the fuel injection device further comprises a cylindrical member including the mover and at least a part of the magnetic core on the mover side, wherein the cylindrical member has a large diameter part and a small diameter part in an inner peripheral surface, and wherein the magnetic core has an outer diameter larger than the inner diameter of the small diameter part of the cylindrical member, and is fixed to the inside of the large diameter part.

(3) In (2), a difference between a radius of an opening formed with the inner diameter enlarged part in the end surface of the magnetic core and a radius of the hole formed in the magnetic core is larger than a difference between a radius of the large diameter part and a radius of the small diameter part.

(4) In (3), a distance between a position of the cylindrical member where the large diameter part is changed to the small diameter part and the end surface of the magnetic core in the direction along the valve stem is longer than a distance between the end surface of the magnetic core and the mover in a valve-closed state where the mover and the valve body stand still.

(5) In (4), the valve body and the mover are relative-displaceably formed separate members, and the valve body has a regulator that regulates relative displacement of the mover with respect to the valve body in a valve opening direction, further, in the hole formed in the magnetic core, apart where an inner diameter of the hole is minimum is formed in the back of the position of the regulator.

(6) In (4), the cylindrical member has a ring shaped concave part in an outer peripheral surface, and the position of the concave part in the direction along the valve stem overlaps the position of the end surface of the magnetic core opposite to the mover.

(7) In (4), the mover has a fuel passage hole formed in the direction along the valve stem, and the central position of the fuel passage hole is provided on an outer peripheral side from the minimum diameter of the hole formed in the magnetic core.

(8) In (4), the area of a flat surface of the mover opposite to the magnetic core is set to be larger than the area of an end surface of the magnetic core opposite to the mover.

(9) In the system in (4), in the mover, an inner diameter enlarged part where an inner diameter is enlarged toward an outer radial direction is provided in a surface opposite to the end surface opposite to the magnetic core, and a start point position of the inner diameter enlarged part in a radial direction is provided on the outer peripheral side from the inner diameter of the end surface of the magnetic core opposite to the mover.

Advantageous Effects of Invention

According to the present invention, a fuel injection device with excellent dynamic responsiveness can be provided.

DESCRIPTION OF EMBODIMENTS

Hereinbelow, operation and structure of a fuel injection device according to embodiments of the present invention will be described using FIGS. 1 to 15.

First Embodiment

Figure 1:
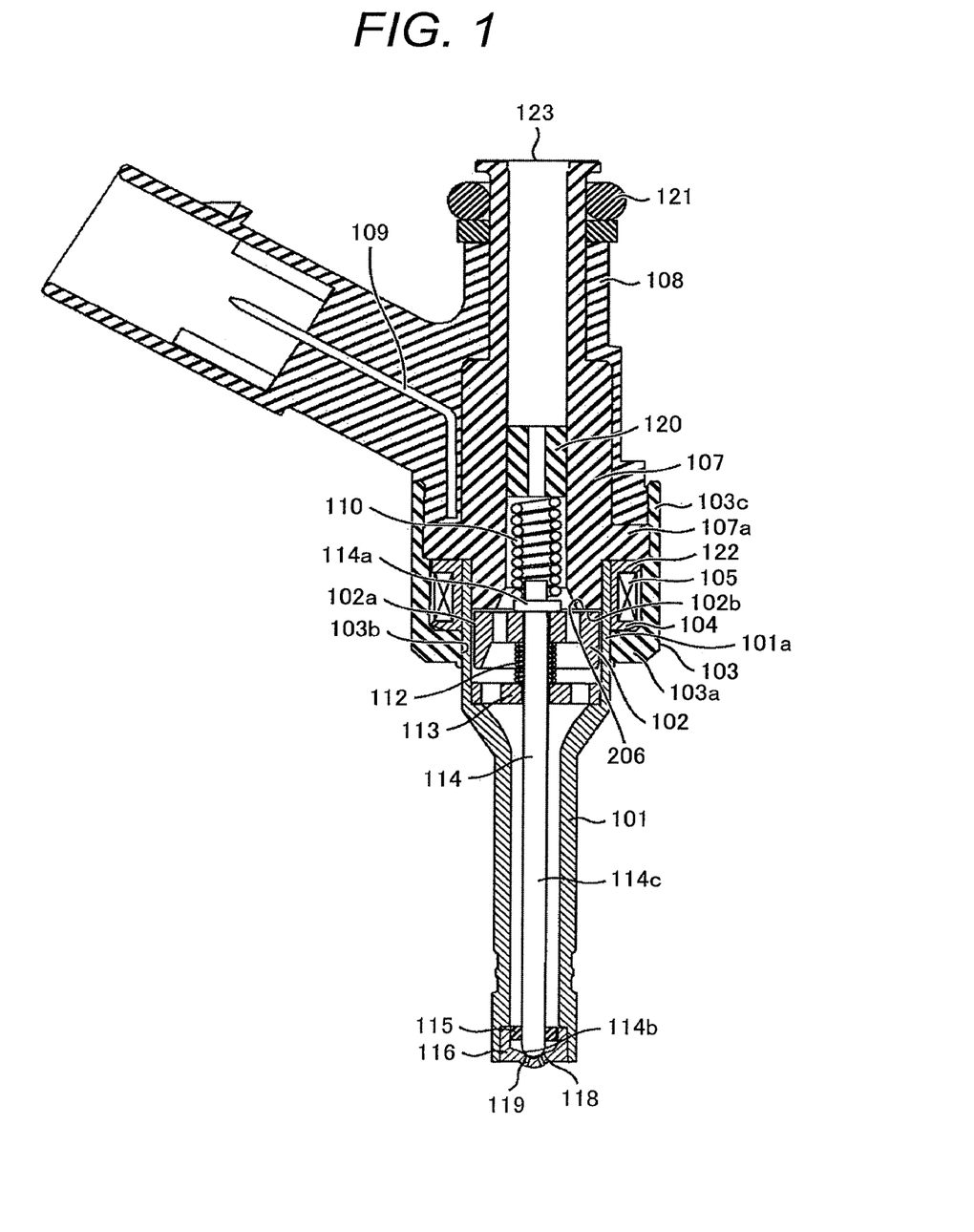
FIG. 1 is a longitudinal cross-sectional view of a fuel injection device in an example according to the present invention.

First, the structure and operation of the fuel injection device in a first embodiment of the present invention will be described using FIG. 1. FIG. 1 is a longitudinal sectional view showing an embodiment of the fuel injection device according to the present invention.

In the present embodiment, a mover (movable core) 102 is not fixed to a valve body 114, but is relatively-displaceably built with respect to the valve body 114. The relative displacement of the mover 102 in a valve opening direction is regulated with a regulator (stopper) 114a of the valve body 114. The regulator 114a is formed with a diameter expanding part having a diameter larger than a valve needle 114c of the valve body 114. A contact part (seat 114b) to come in contact with a valve seat 118 is provided on the other end side to the regulator 114a. The relative displacement of the mover 102 to the side of the contact part (seat 114b), i.e. in the valve closing direction, is not regulated with the valve body 114.

The fuel injection device in FIG. 1 having the above structure is a normally valve-closed type electromagnetic fuel injection device. When the fuel injection device is not energized with a coil 105, the valve body 114 is pressed in the valve closing direction with a spring (first spring) 110, in close contact with the valve seat 118, in a valve-closed state. In this valve-closed state, the mover 102 is brought in close contact with the regulator 114a of the valve body 114 with a zero spring (second spring) 112, forming a gap between the mover 102 and a magnetic core (stationary core) 107. Fuel is supplied from a fuel supply port 123 provided in an upper part of the fuel injection device, and the valve seat 118 seals the fuel. Upon valve closing, a force with the spring 110 and a force with fuel pressure act on the valve body 114 in the valve closing direction, and the valve body 114 is pressed in the valve closing direction. One end of the spring (first spring) 110 on the opposite side to the end in contact with the valve body 114 is in contact with an adjuster pin 120. The spring force of the spring 110 is adjusted with the adjuster pin 120.

A magnetic circuit to generate an electromagnetic force for valve opening/closing has the magnetic core 107, the mover 102, a nozzle holder 101 which is a cylindrical member arranged on the outer peripheral side of the magnetic core 107 and the mover 102 so as to include at least a part of the magnetic core 107 on the mover 102 side and the mover 102, and a housing 103. In the housing 103, a radial direction extension part 103a extending in a radial direction is formed at its lower end. An inner peripheral surface 103b of the radial direction extension part 103a is in contact with an outer peripheral surface of a part 101a of the nozzle holder 101 facing an outer peripheral surface 102a of the mover 102. Further, the housing 103 surrounds the outer periphery of the coil 105, and an inner peripheral surface of a part 103c in a position higher than the coil 105 is in contact with an outer peripheral surface of a flange 107a of the magnetic core 107. The housing 103 forms a yoke of the magnetic circuit.

When an electric current is supplied to the coil 105, a magnetic flux occurs in the magnetic circuit, and a magnetic attraction force occurs between the mover 102 as a movable member and the magnetic core 107 as a fixed member. When the magnetic attraction force acting on the mover 102 exceeds the sum of the load by the spring 110 and the force acting on the valve body 114 by the fuel pressure, the mover 102 moves upward. At this time, the valve body 114 moves upward together with the mover 102 until an upper end surface 102b of the mover 102 collides with a lower surface of the magnetic core 107. As a result, a seat 114b of the valve body 114 moves away from the valve seat 118, and the supplied fuel is injected from plural injection orifice 119. Note that the number of the injection orifices 119 may be one. Further, the injection orifice 119 and the valve seat 118 are formed in an orifice cup 116 attached to an end of the nozzle holder 101. Further, a plunger rod guide 115 to guide the valve body 114 is provided on the upstream side of the orifice cup 116.

Next, after the collision of the upper end surface 102b of the mover 102 with the lower surface (mover side end surface) 206 of the magnetic core 107, the regulator 114a of the valve body 114 moves away from the mover 102 to overshoot. After a predetermined period, the valve body 114 comes to stand still on the mover 102 by contact between the regulator 114a and the mover 102. When the supply of the electric current to the coil 105 is stopped, the magnetic flux caused in the magnetic circuit is reduced, and the magnetic attraction force is lowered. When the magnetic attraction force is lower than a resultant force of the load by the spring 110 and a fluid force applied to the valve body 114 and the mover 102 by the fuel pressure, the mover 102 and the valve body 114 move downward, and upon collision between the valve body 114 and the valve seat 118, the regulator 114a of the valve body 114 moves away from the mover 102. On the other hand, the valve body 114 comes to stand still after the collision with the valve seat 118, and the fuel injection is stopped.

Note that it may be arranged such that the mover 102 and the valve body 114, as members which are not relatively displaced, are integrally formed as the same member, otherwise, as separate members, welded or coupled by press-insertion or the like not to be relatively displaced. In the case where the mover 102 and the valve body 114 as the same member are not relatively displaced, the zero spring 112 is not required in this arrangement. In this structure, the advantages of the present invention are the same.

Figure 2:
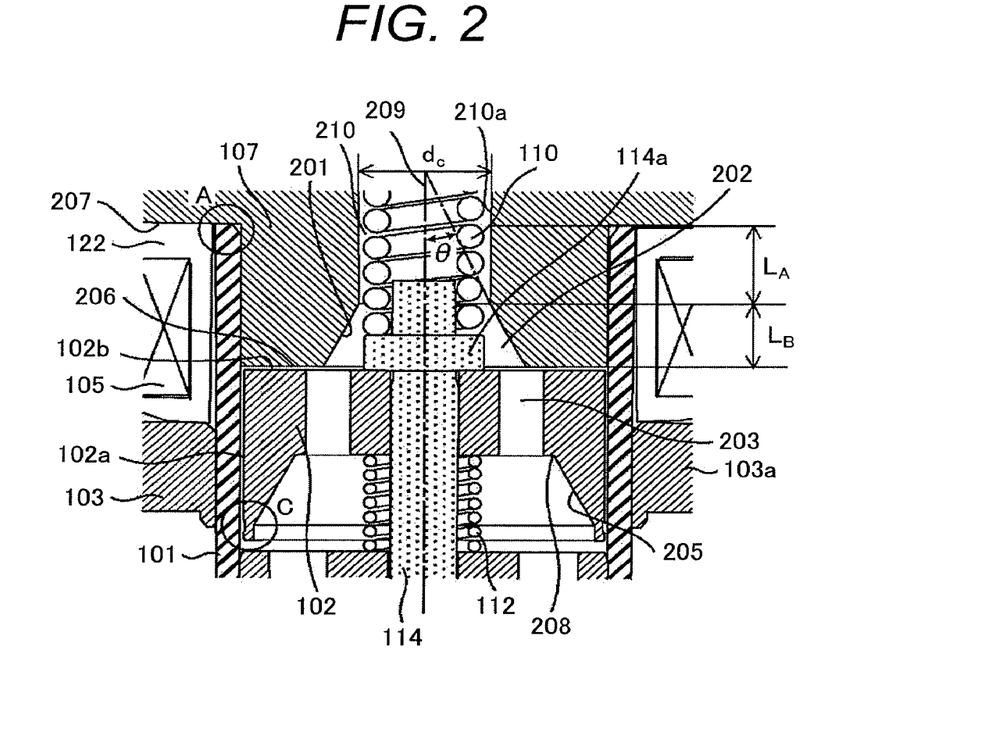
FIG. 2 is an enlarged view of a cross section of a driving unit in the fuel injection device in a first embodiment of the present invention.
Figure 3:
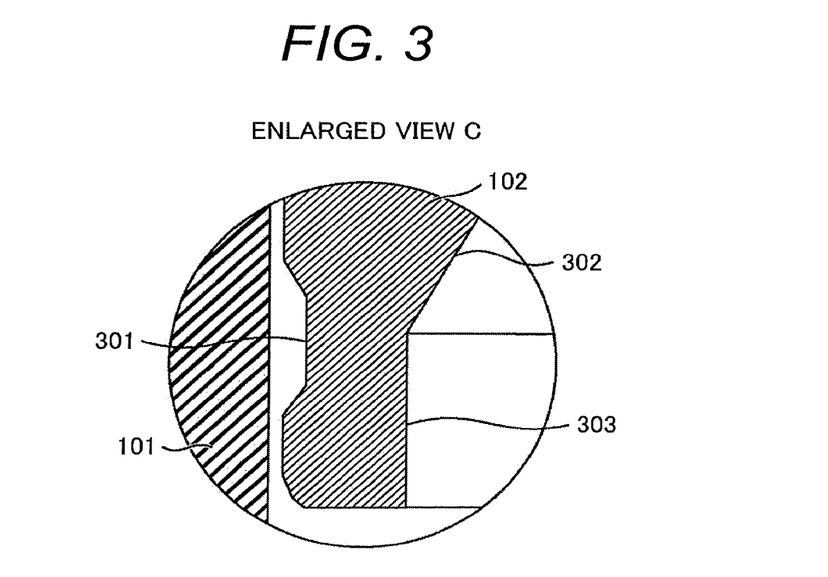
FIG. 3 is an enlarged view C of an outer diameter side lower surface of a mover in FIG. 2.
Figure 4:
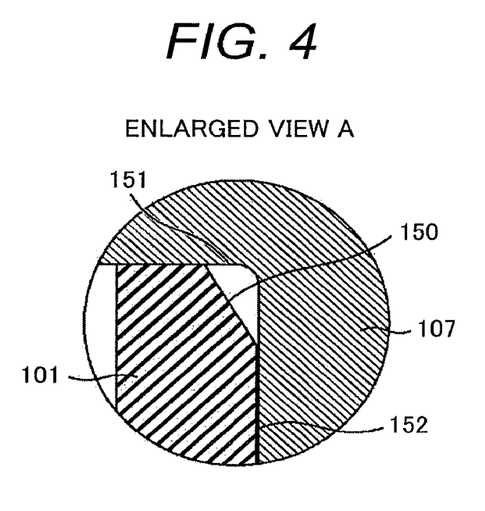
FIG. 4 is an enlarged view of a contact part A between an upper end surface of a nozzle holder and a magnetic core in FIG. 2.

Next, the structure of the first embodiment in the present invention will be described using FIGS. 1 to 4. FIG. 2 is an enlarged view of the cross section of a driving unit of the fuel injection device in FIG. 1. FIG. 3 is an enlarged view of an outer diameter side lower surface C of the mover 102 in FIG. 2. Further, FIG. 4 is an enlarged view of a contact part A between an upper end surface of the nozzle holder 101 and the magnetic core 107 in FIG. 2. Note that in FIGS. 2 to 4, the constituent elements the same as those in FIG. 1 have the same reference numerals.

In the fuel injection device according to the present invention, by supplying an electric current to the coil 105, a magnetic flux occurs in the magnetic circuit having the magnetic core 107, the mover 102, the housing 103 and the nozzle holder 101, and a magnetic attraction force occurs between the magnetic core 107 and the mover 102. The magnetic flux flowing through the magnetic core 107 is divided into a magnetic flux flowing to the nozzle holder 101 side in the position of the end surface 206 of the magnetic core 107 on the mover 102 side and a magnetic flux flowing to the attracting surface side of the magnetic core 107 i.e. a magnetic flux flowing to the side of the magnetic gap between the magnetic core 107 and the mover 102. At this time, the number of magnetic fluxes passing between the magnetic core 107 and the mover 102 and the density of the magnetic flux determine the magnetic attraction force.

In the present embodiment, an inner diameter enlarged part 201 in which the inner diameter is enlarged toward the attracting surface is provided on the inner diameter side of the mover side end surface 206 of the magnetic core 107. In the magnetic core 107, a through hole 210 is formed in its central position in the valve stem direction. The through hole 210 forms a fuel passage. The inner diameter enlarged part 201 is formed in the vicinity of an exit of the through hole 210 such that the inner diameter becomes gradually smaller from the mover side end surface 206 toward the upstream side of the fuel flow direction. With this arrangement, by reducing the area of the mover side end surface 206 while ensuring the cross sectional area through which the magnetic flux passes, on the side of the magnetic core 107 away from the mover side end surface 206 with respect to the mover 102, it is possible to increase the magnetic flux density of the attracting surface and improve the magnetic attraction force. Note that it is preferable that in the inner diameter enlarged part 201, the magnetic gap with respect to the mover 102 in a direction along the valve stem is enlarged as the inner diameter of the inner diameter enlarged part 201 becomes smaller, i.e., as it approaches the center of the radial direction of the magnetic core 107. This increases the magnetic gap between the magnetic core 107 and the mover 102 in the inner diameter enlarged part 201 (the interval in the valve stem direction) to a gap larger than the magnetic gap between the mover side end surface 206 and the mover 102, to increase the magnetic resistance. With this arrangement, it is possible to reduce the magnetic flux passing through the inner diameter enlarged part 201 and increase the magnetic flux passing through the mover side end surface 206, and increase the magnetic flux density in the mover side end surface 206. Further, it is highly advantageous that a height $L_A$ from a lower surface 207 of the magnetic core 107 positioned on the upper side of the coil 105 to the upper end of the inner diameter enlarged part 201 is set to a greater value than a height $L_B$ of the inner diameter enlarged part 201 in the valve stem direction. With these settings, it is possible to increase the magnetic flux density by the reduction of the attracting surface while ensuring the cross-sectional area of the magnetic path of the magnetic core 107 positioned on the inner diameter side of the coil 105 and improve the attraction force. Note that it is preferable that the inner diameter enlarged part 201 is tapered.

In the case where the inner diameter enlarged part 201 is tapered, for the sake of convenience of processing, it is preferable that tapered parts are formed in the upstream and downstream parts at angles different from that of the tapered part of the inner diameter enlarged part 201. In this case, the inner diameter enlarged part 201 may be regarded as a 3-step tapered member. In the downstream side tapered part, an angle θ formed with a valve stem 209 is increased. With this arrangement, as the occurrence of flash in the progress of processing can be prevented in the upstream and downstream parts of the inner diameter enlarged part 201, processing costs can be reduced.

Further, when an electric current is supplied to the coil 105, the magnetization progresses from the coil inside toward the outside by the influence of the excess current. On the other hand, when the supply of the electric current to the coil 105 is stopped, the magnetic flux disappears from a position close to the coil 105. When the supply of the electric current to the coil 105 is stopped from the electric-current supplied status, the magnetic flux remains to the end on the inner diameter side of the magnetic core 107 positioned away from the coil 105. Accordingly, even when the supply of the electric current to the coil 105 is stopped, magnetic delay time exists before the magnetic attraction force is lowered. The magnetic delay time degrades the responsiveness upon valve closing. Accordingly, it is possible to reduce the magnetic delay time by narrowing the width of the magnetic material in a magnetization progressing direction.

In the present invention, as the inner diameter enlarged part 201 is provided in the magnetic core 107, the thickness of the mover side end surface 206 of the magnetic core 107 is reduced. That is, the magnetic material of the magnetic core 107 on the inner peripheral side (inner diameter side) is reduced by forming the inner diameter enlarged part 201, and with this arrangement, the thickness of the magnetic core 107 is thinned. With this arrangement, it is possible to reduce the magnetic delay time from the supply of the electric current to the coil 105 to the rise of the magnetic flux upon valve opening and magnetic delay time from the stoppage of the supply of the electric current to the coil 105 to the reduction of the magnetic flux upon valve closing. Thus it is possible to improve the responsiveness upon valve opening/closing. As described above, according to the first embodiment of the present invention, it is possible to improve the magnetic attraction force and the dynamic responsiveness.

Note that in the structure where the cylindrical nozzle holder 101 is provided outside the magnetic core 107, the distance from the coil 105 to the magnetic core 107 is increased by the thickness of the nozzle holder. When the distance between the coil 105 and the magnetic core 107 is increased, the speed of the progress of magnetization and the speed of demagnetization are lowered and the responsiveness is degraded by the influence of excess current. Accordingly, the advantage obtained with the inner diameter enlarged part 201 of the magnetic core 107 capable of reducing the influence of the excess current is remarkable.

Further, in the inner diameter enlarged part 201 provided in the magnetic core 107, as the inner diameter is enlarged in a downstream direction, the fluid passage can be ensured between the magnetic core 107 and the valve body 114. Note that when the mover 102 and the valve body 114 are relative-displaceably arranged separate members, the range of the inner diameter enlarged part 201 is preferably from the mover side end surface 206 of the magnetic core 107 to the upstream of the regulator (stopper) 114a provided in the valve body 114. With this arrangement, it is possible to ensure a sufficient fluid passage between the valve body 114 and the magnetic core 107. Note that the fuel flowing between the valve body 114 and the magnetic core 107 passes through a fuel passage hole 203 provided in the mover 102 and flows in a downstream direction. As the central position of the fuel passage hole 203 is on the outer diameter side from the inner diameter dc of the magnetic core 107, it is possible to ensure the area of the fluid passage for the fuel passing through the mover 102. Further, the central position of the fuel passage hole 203 in the mover 102 is preferably on the inner diameter side from the inner diameter of the mover side end surface 26 of the magnetic core 107. As a main passage of the magnetic flux in the mover 102 is on the outer diameter side from the inner diameter of the mover side end surface 206 of the magnetic core 107, it is possible to suppress reduction of the cross-sectional area of the magnetic path in the mover 102 with the fuel passage by defining the central position of the fuel passage hole 203. Note that the fuel passage hole may be provided in the valve body 114 in place of the mover 102.

Further, it may be arranged such that the inner diameter of a plane part of the mover 102 opposite to the magnetic core 107 is smaller than the inner diameter of the mover side end surface 206 of the magnetic core 107. With this arrangement, even when the mover 102 is in an eccentric position shifted from the central position, as the attraction area is determined with the mover side end surface 206 of the magnetic core 107, variation of the magnetic attraction force can be suppressed. With this arrangement, it is possible to suppress variation of injection amount by each injection and suppress variation of injection amount due to individual difference.

Further, it is preferable that the position of the magnetic gap in the valve stem direction, between the magnetic core 107 and the mover 102 overlaps the position of the coil space, having the coil 105 and the bobbin 104 in the valve stem direction, in a status where the mover 102 stands still in contact with the regulator 114a of the valve body 114. When the magnetic gap is in a position lower than the coil space, the area of the side surface part of the mover 102 cannot be sufficiently obtained. Since there is a gap between the side surface of the mover 102 and the nozzle holder 101, the magnetic resistance of the side surface of the mover 102 is easily increased. To reduce the magnetic resistance in this part, it is necessary to increase the area of the side surface for passage of magnetic flux. For this purpose, it is necessary to increase the area of the side surface of the mover 102, i.e., the height of the mover 102. Accordingly, even when a sufficient height of the mover 102 is ensured, the mover side surface approaches to the inner diameter part of the housing 103 by arranging the position of the magnetic gap in the stem direction in the coil space. Accordingly, it is possible to improve the attraction force.

Further, as shown in FIG. 4, it is preferable that a run off part 150 for press fitting with the magnetic core 107 is formed on the inner diameter side of the upper end surface of the nozzle holder 101. An R-shaped machining result occurs at a corner of the magnetic core 107 in contact with the upper end surface of the nozzle holder 101. Accordingly, when the nozzle holder 101 and the magnetic core 107 are assembled by press fitting or the like, it is necessary to provide the run off in the contact part. By providing the run off part 150, not in the magnetic core 107 but in the nozzle holder 101, it is possible to suppress reduction of the cross-sectional area of the magnetic path of the magnetic core 107 by the run off for press fitting, and improve the attraction force. Generally, it is inevitable to use material with low magnetic characteristic as the nozzle holder 101 requiring strength. When the run off is provided on the nozzle holder 101 side, it is advantageously not necessary to reduce the cross sectional area of the magnetic core 107 having excellent magnetic characteristic. Note that the run off part 150 provided in the nozzle holder 101 has, e.g., a taper part.

Note that it is preferable to provide an inner diameter enlarged part 205, in which the inner diameter is enlarged toward the outer diameter direction, in a surface (rear surface) of the mover 102, opposite to the end surface facing the magnetic core 107. Note that when the thickness of the mover 102 in the inner diameter part is increased for the purpose of ensuring the cross-sectional area of the magnetic path to improve the attraction force, the mass is increased, and the acceleration of the mover 102 upon valve opening/closing is lowered, and further, time required for valve opening/closing is increased. Accordingly, in the mover 102, it is desirable that the magnetic path cross-section is ensured and the mass is reduced.

In the structure of the magnetic core 107 and the mover 102, in the mover side end surface 206 of the magnetic core 107, as the outer diameter side rather than the inner diameter side is a main route for passing magnetic flux in the mover 102, it is necessary to arrange magnetic bodies so as to ensure the cross-sectional area of the magnetic path on the outer diameter side of the mover. Accordingly, when a start point 208 of the inner diameter enlarged part 205 provided in the mover 102 is positioned on the outer diameter side from the inner diameter of the mover side end surface 206 of the magnetic core 107, it is possible to reduce the mass while ensuring a necessary cross-sectional area of the magnetic path of the mover 102. In the present invention, since the inner diameter enlarged part 201 is provided in the magnetic core 107, it is possible to suppress the volume of the inner diameter enlarged part 205 to a minimum value, and reduce the mass of the mover 102.

Further, as shown in FIG. 3, it is preferable that a low inner diameter surface 303 which is a peripheral surface parallel to the valve stem below a slope 302 of the mover 102 is provided, and a concave part 301 is provided on the outer peripheral surface of the mover 102 opposite to the low inner diameter surface 303. Note that in the fuel injection device in which the magnetic core 107 and the mover 102 are in contact, to increase the strength of a collision surface, the contact surface between the magnetic core 107 and the mover 102 is subjected to plating e.g. chrome plating. When the mover 102 is subjected to plating, a groove to fix the position of the mover 102 is necessary on the outer diameter surface. However, as the outer diameter of the mover 102 is a magnetic path through which magnetic flux passes, when the concave part 301 of the mover 102 is positioned in the upper part of the mover 102, the magnetic resistance between the outer diameter of the mover 102 and the nozzle holder 101 is increased, and the attraction force is lowered. According to the above-described structure, the suppression of the reduction of the attraction force and the plating of the mover 102 are facilitated.

Second Embodiment

Figure 5:
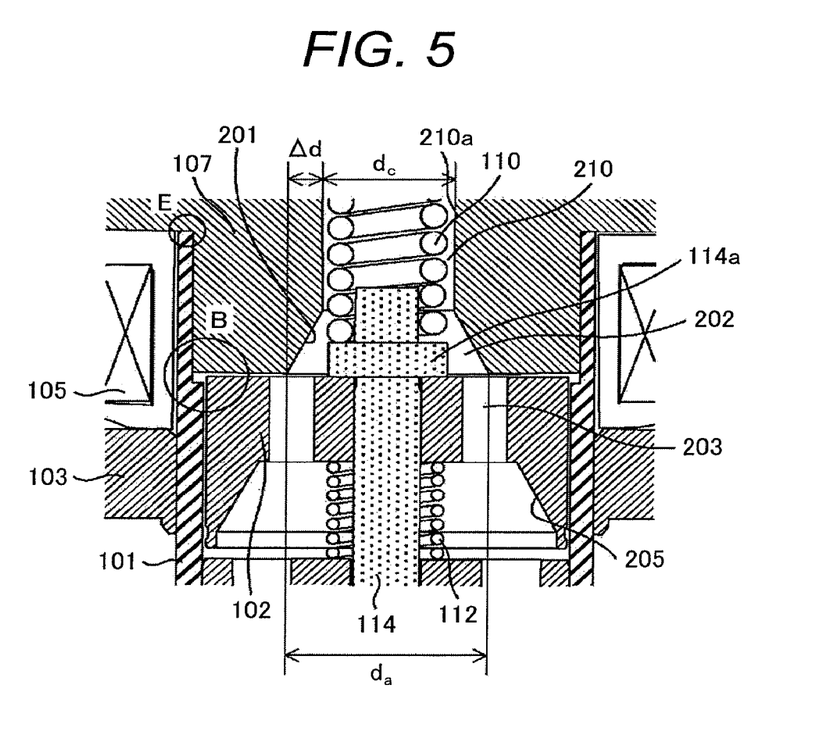
FIG. 5 is an enlarged view of the cross section of a driving unit in the fuel injection device in a second embodiment of the present invention.
Figure 6:
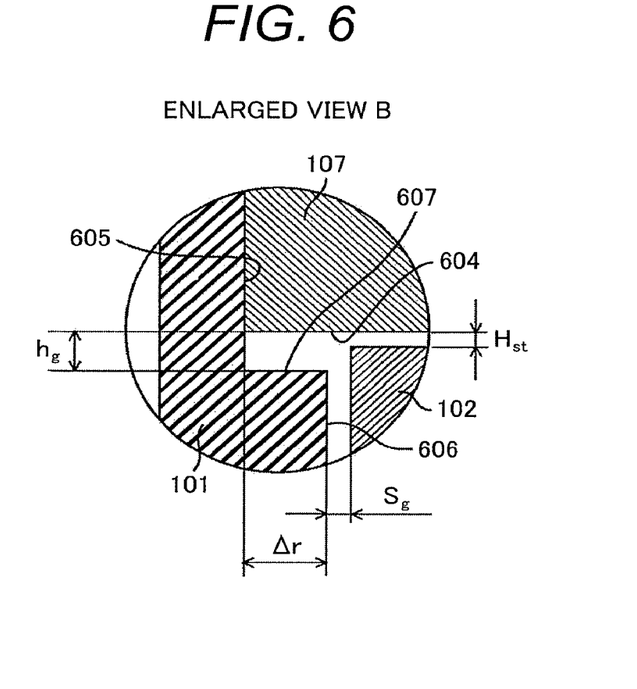
FIG. 6 is an enlarged view of an outer peripheral part B of the magnetic core in FIG. 5.
Figure 7:
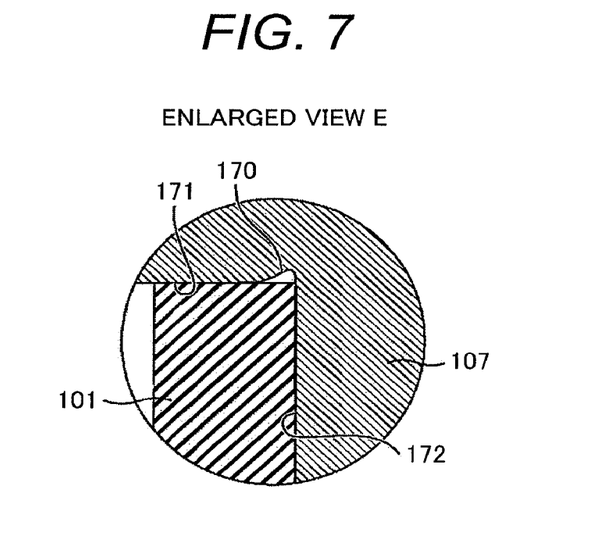
FIG. 7 is an enlarged view of a contact part E between the upper end surface of the nozzle holder and the magnetic core in FIG. 5.

Next, a second embodiment according to the present invention will be described using FIGS. 5 to 7. FIG. 5 is an enlarged view of the cross section of the driving unit in the fuel injection device in the second embodiment. FIG. 6 is an enlarged view of an outer peripheral part B of the magnetic core in FIG. 5. FIG. 7 is an enlarged view of a contact part E between the upper end surface of the nozzle holder and the magnetic core in FIG. 5. Note that in FIGS. 5 to 7, constituent elements the same as those in FIGS. 1 and 2 have the same reference numerals.

In the example shown in FIGS. 5 and 6, in addition to the first embodiment, the nozzle holder 101 is provided with a large inner diameter part 605 having a large inner diameter and a small inner diameter part 606 having a small inner diameter. With this arrangement, the outer diameter of the magnetic core 107 is larger than the small inner diameter part 606 of the nozzle holder 101. Note that it is more difficult to ensure the cross-sectional area of the magnetic core 107 provided on the inner diameter side of the coil 105 than to ensure the cross-sectional area of the housing 103 provided on the outer diameter side of the coil 105, from the geometrical relation of the cross-sectional area. Accordingly, the attracting surface of the magnetic core 107 comes to magnetic saturation early on in comparison with the housing 103 due to its small cross-sectional area of the magnetic path. Accordingly, in the present embodiment, the outer diameter of the magnetic core 107 is larger than the small inner diameter part 606 of the nozzle holder 101, so as to ensure the cross-sectional area of the magnetic core 107 in the radial direction. Further, it is preferable that the area of a mover side end surface 604 of the magnetic core 107 is smaller 10% or higher percent in comparison with the cross-sectional area of the magnetic core 107 upstream of the inner diameter enlarged part 201. This prevents the magnetic core 107 from entering the saturated magnetic-flux density status. It is possible to increase the number of magnetic fluxes occur in the magnetic circuit by reducing the magnetic flux density in the magnetic core 107.

Further, when a soft magnetic material is used as the magnetic core 107, it is preferable that the area of the mover side end surface 604 of the magnetic core 107 is smaller 10% or higher percent in comparison with the cross-sectional area in the upstream position from the inner diameter enlarged part 201. In a general soft magnetic material, when the magnetic flux density is smaller about 10% than the saturated magnetic flux density, the soft magnetic material changes from the magnetic saturation state and the magnetic permeability is increased. Accordingly, when the magnetic core 107 has a larger cross-sectional area than the area of the mover side end surface 604 of the magnetic core 107, it is possible to suppress the magnetic flux density of the magnetic core 107 except the attracting surface and approximate the magnetic flux density of only the attracting surface to the saturated magnetic flux density. With this arrangement, it is possible to reduce the magnetic resistance of the magnetic core 107 and increase the attraction force. Further, it is preferable that the outer diameter of the mover side end surface 604 of the magnetic core 107 is larger than the small inner diameter part 606 of the nozzle holder 101. As magnetization starts from the inner diameter side of the coil 105 by the influence of excess current, the speed of magnetization is accelerated to improve the dynamic responsiveness by reducing the distance between the magnetic core 107 and the coil 105.

Further, as shown in FIG. 6, the nozzle holder 101 has a change position 607 where the large inner diameter part 605 is changed to the small inner diameter part 606. It is preferable that a gap $h_g$ in the stem direction between the change position 607 and the mover side end surface 604 of the magnetic core 107 is greater than a distance $H_{st}$ between the magnetic core 107 and the mover 102 in a status where the valve body 114 and the mover 102 stand still in the valve-closed state. When the outer diameter of the magnetic core 107 is larger than the small inner diameter part 606 of the nozzle holder 101, the magnetic flux easily flows from the mover side end surface 604 of the magnetic core 107 to the change position 607. When the gap $h_g$ is set as above, it is possible to suppress the magnetic flux flowing from the mover side end surface 604 of the magnetic core 107 to the change position 607 of the nozzle holder 101 to a minimum amount. That is, it is possible to increase the magnetic flux flowing between the magnetic core 107 and the mover 102 and improve the magnetic attraction force. Note that as an example of the shape of the change position 607 of the nozzle holder 101, FIG. 6 shows a flat surface. In this flat surface shape, the range of the small inner diameter part 606 of the nozzle holder 101 in the close vicinity of the side surface of the mover 102 can be increased. As the magnetic resistance between the mover 102 and the small inner diameter part 606 is reduced, it is possible to obtain a strong magnetic attraction force. Note that the change position may have a tapered shape in which the inner diameter is smaller toward the downstream side or a shape including a curvature.

Further, it is preferable that a distance Δr between the small inner diameter part 606 and the large inner diameter part 605 is greater than a gap $S_g$ between the mover 102 and the small inner diameter part 606 of the nozzle holder 101. When the distance Δr is greater than the gap $S_g$, the gap $S_g$ can be reduced, and the magnetic resistance between the mover 102 and the nozzle holder 101 can be reduced. With this arrangement, it is possible to improve the magnetic attraction force.

Further, as shown in FIGS. 5 and 7, it is more difficult to ensure the cross-sectional area of the magnetic core 107 positioned on the inner diameter side of the coil 105 than to ensure the cross-sectional area of the magnetic core 107 positioned on the outer diameter side of the coil 105, from the geometrical relation of dimensions. Accordingly, when a run off is provided in the magnetic core 107, it is preferable to provide e.g. a run off part 170 in, not a cylindrical surface 172 on which the magnetic core 107 is in contact with the inner diameter of the nozzle holder 101, but a contact surface 171 in contact with the upper end surface of the nozzle holder 101. With this arrangement, it is possible to suppress the reduction of the cross-sectional area of the magnetic path of the magnetic core 107 and improve the magnetic attraction force.

The half of the difference between an opening diameter $d_a$ of the inner diameter enlarged part 201 and an inner diameter (diameter of the fuel passage 210) $d_c$ of the magnetic core 107, i.e., the difference Δd between the radius of the inner diameter enlarged part 201 and the radius of the through hole 210a of the magnetic core 107 is greater than a distance Δr between the small inner diameter part 606 and the large inner diameter part 605. The difference Δd is also an interval between an opening circle of the inner diameter enlarged part 201 and an inner peripheral circle of the magnetic core 107 in the radial direction (direction orthogonal to the valve stem). The tapered part of the inner diameter enlarged part 201 is provided in the range of this interval in the radial direction. To obtain the areas, between two circles having different radii, mutually identical in radial positions away from the circle centers and in radial positions close to the circle centers, the difference of radii of the two circles in the radial positions away from the circle centers can be reduced more than in the radial positions close to the circle centers. Accordingly, in the end surface of the magnetic core 107, opposite to the mover 102, when the area reduced by forming the inner diameter enlarged part 201 is complemented with the outer periphery part of the magnetic core 107, the distance Δr may be small with respect to the difference Δd. From the converse point of view, it is necessary to increase the difference Δd with respect to the ensured distance Δr.

Third Embodiment

Figure 8:
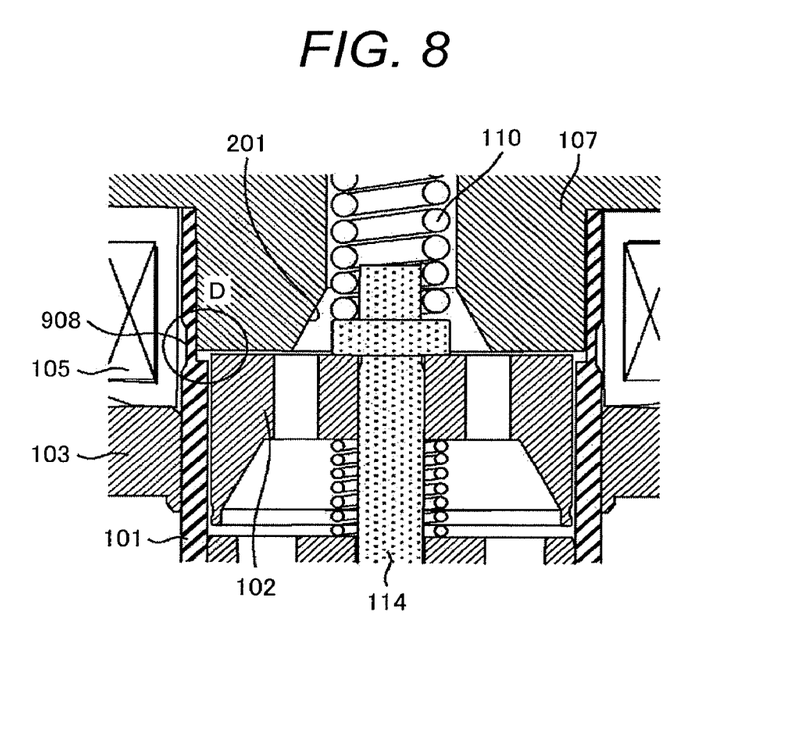
FIG. 8 is an enlarged view of the cross section of the driving unit in the fuel injection device in a third embodiment of the present invention.
Figure 9:
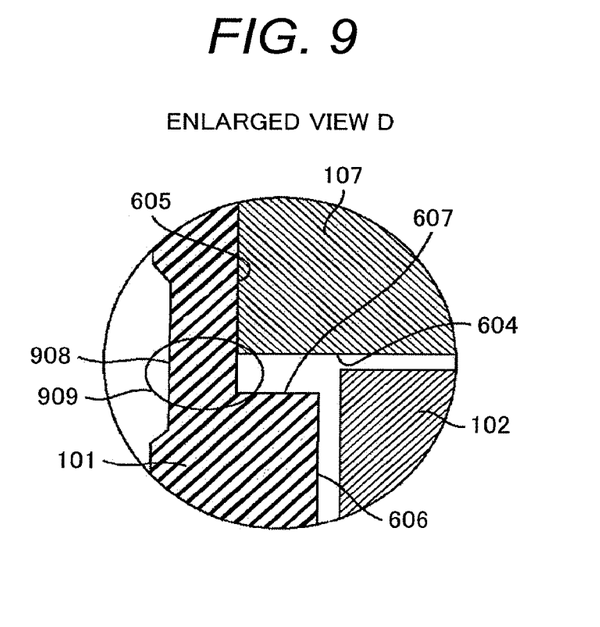
FIG. 9 is an enlarged view of an outer peripheral part D of the magnetic core in FIG. 8.

A third embodiment in the present invention will be described using FIGS. 8 and 9. FIG. 8 is an enlarged view of the cross section of the driving unit in the fuel injection device in the third embodiment according to the present invention. FIG. 9 is an enlarged view of an outer peripheral part D of the magnetic core in FIG. 8. Note that in FIGS. 8 and 9, the constituent elements the same as those in FIGS. 1, 2, 5 and 6 have the same reference numerals.

In the example shown in FIGS. 8 and 9, in addition to the second embodiment, a small outer diameter part 908 smaller than the outer diameter of the nozzle holder 101 is provided in the outer peripheral surface of the nozzle holder 101. The large inner diameter part 605 of the nozzle holder 101 in contact with the magnetic core 107 and a small outer diameter part 908 form a magnetic aperture 909. The small outer diameter part 908 forms a ring concave part (groove) in the outer peripheral surface of the nozzle holder 101 so as to surround the valve stem. When the nozzle holder 101 is provided with the magnetic aperture 909, it is possible to reduce the magnetic flux flowing through the nozzle holder 101 and increase the magnetic flux flowing between the magnetic core 107 and the mover 102. The increment of the magnetic flux improves the magnetic attraction force. Further, the magnetic flux flowing through the magnetic core 107 and the nozzle holder 101 is divided into a magnetic flux flowing to the mover 102 and a magnetic flux flowing to the magnetic aperture 909 of the nozzle holder 101 in the position of the mover side end surface 604 of the magnetic core 107. Note that as the position of the small outer diameter part 908 in the valve stem direction is on an extended line from the outer radial direction of the mover side end surface 604 of the magnetic core 107, it is possible to suppress the magnetic flux flowing to the magnetic aperture 909 and pass more magnetic fluxes to the side of the mover 102. Accordingly the attraction force can be improved. Further, as the magnetic aperture 909 is provided and the cross-sectional area of the magnetic path of the magnetic aperture 909 can be reduced, it is possible to reduce the time from the supply of the electric current to the coil 105 to the magnetic saturation of the magnetic aperture 909. With this arrangement, it is possible to increase the speed of progress of the magnetization in the inner diameter side of the magnetic core 107 and the mover 102 and improve the responsiveness of the dynamic attraction force.

Fourth Embodiment

Figure 10:
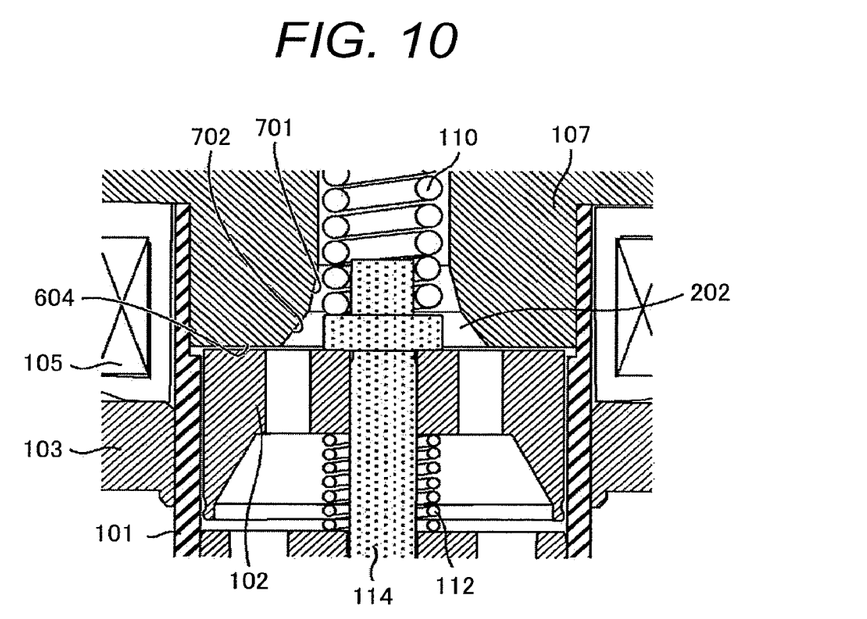
FIG. 10 is an enlarged view of the cross section of the driving unit in the fuel injection device in a fourth embodiment of the present invention.

A fourth embodiment according to the present invention will be described using FIG. 10. FIG. 10 is an enlarged view of the cross section of the driving unit in the fuel injection device in the fourth embodiment according to the present invention. Note that in FIG. 10, the constituent elements the same as those in FIGS. 1, 2 and 6 have the same reference numerals.

In the example shown in FIG. 10, in addition to the second embodiment, plural tapered parts, a first taper 701 and a second taper 702, are provided on the inner diameter side of the magnetic core 107. Note that in the fuel injection device according to the present invention, as the inner diameter of the magnetic core 107 is used as a fuel passage, it is desirable to ensure the cross-sectional area of the magnetic path of the magnetic core 107 required for improvement in the attraction force and the cross-sectional area of the fuel passage between the valve body 114 and the magnetic core 107 required as a fuel passage. For the above reason, it is possible to increase the cross-sectional area of the fuel passage from the second taper 702 toward the downstream direction while ensuring the cross-sectional area of the magnetic path positioned away from the mover side end surface 604 of the magnetic core 107 and facilitate designing of the fuel injection device by changing the angle of the taper in the inner diameter of the magnetic core 107.

Fifth Embodiment

Figure 11:
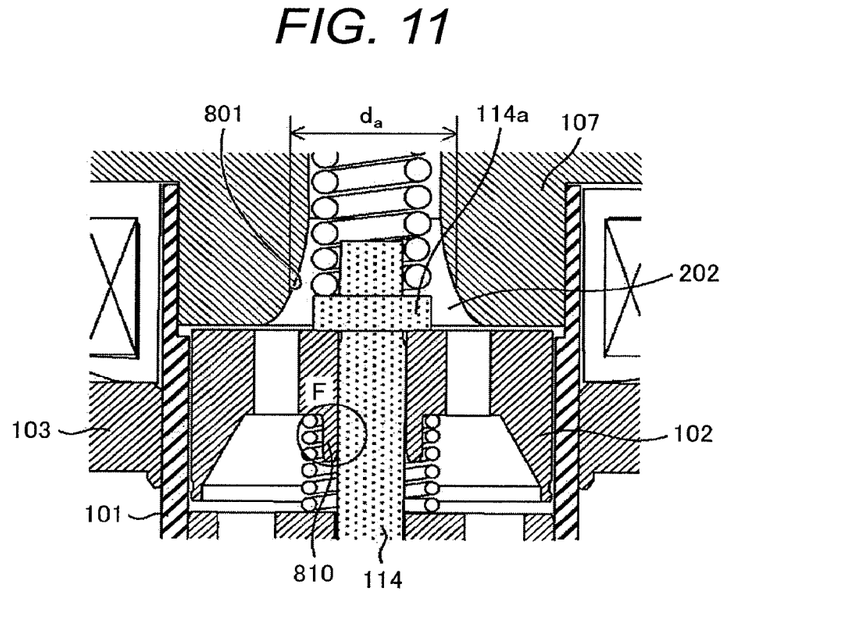
FIG. 11 is an enlarged view of the cross section of the driving unit in the fuel injection device in a fifth embodiment of the present invention.
Figure 12:
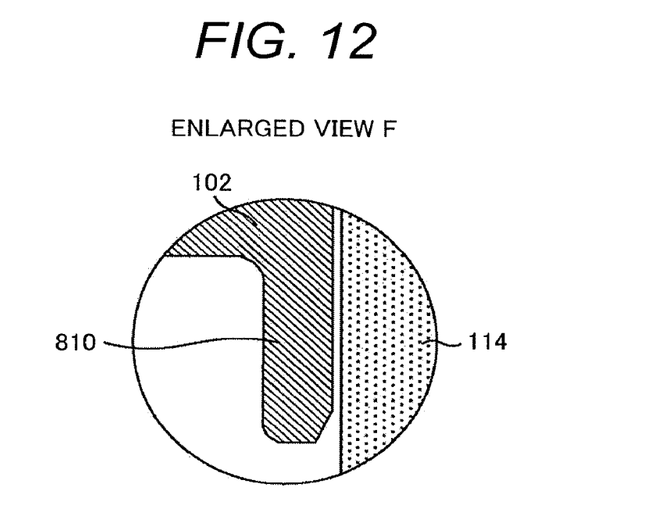
FIG. 12 is an enlarged view of an inner diameter part F of a mover in FIG. 11.

A fifth embodiment according to the present invention will be described using FIGS. 11 and 12. FIG. 11 is an enlarged view of the cross section of the driving unit in the fuel injection device in the fifth embodiment. FIG. 12 is an enlarged view of an inner diameter part F of the mover 102 in FIG. 11. Note that in FIGS. 11 and 12, the constituent elements the same as those in FIGS. 1, 2 and 6 have the same reference numerals.

In the example shown in FIG. 11, in addition to the second embodiment, in the inner peripheral surface of the magnetic core 107, the inner diameter enlarged part 201 in which the inner diameter is enlarged toward the attracting surface is an inner diameter enlarged part 801 having a shape including a curvature. Note that the cross-sectional area of the fuel passage on the inner diameter side of the magnetic core 107 is the minimum between the regulator 114a provided in the valve body 114 and the magnetic core 107. As the magnetic aperture provided on the inner diameter side of the magnetic core 107 has a shape including a curvature such as the inner diameter enlarged part 801, it is possible to increase the cross-sectional area of the magnetic path of the magnetic core 107 in the upstream and downstream parts without changing an inner diameter $d_a$ of the magnetic core 107 in a part where the cross-sectional area of the fuel passage is most reduced. With this arrangement, it is possible to increase the number of magnetic fluxes which occur in the magnetic core 107 and improve the attraction force.

Further, it is desirable that in the gap between the mover 102 and the inner diameter of the nozzle holder 101, even when the mover 102 is inclined, it does not come into contact with the nozzle holder 101. When the mover 102 and the nozzle holder 101 come into in contact with each other, frictional resistance applied to the mover 102 is increased and the responsiveness of the opening/closing valve is reduced.

Further, the mover 102 is provided with a slide extension part 810 to extend a slide surface in contact with the valve body 114. Note that the inclination of the mover 102 with respect to the valve body 114 is determined with the gap between the mover 102 and the valve body 114 and a slide height. In the present embodiment, as the mover 102 is provided with the slide extension member 810, it is possible to extend the slide height of the valve body 114 and the mover 102 and suppress the inclination and eccentricity of the mover 102 with respect to the valve body 114. With this arrangement, it is possible to reduce the gap between the mover 102 and the nozzle holder 101. As the magnetic resistance of the outer diameter of the mover 102 is reduced, the magnetic attraction force can be improved. Further, when the mover 102 is eccentric, the flow amount between the outer diameter of the mover 102 and the inner diameter of the nozzle holder 101 is increased and the fluid resistance applied to the mover 102 is changed. In accordance with change of the fluid resistance, the behavior of the mover 102 differs by each injection, and injection amount is greatly varied. For the above reasons, it is possible to suppress the eccentricity of the mover 102 and reduce the variation of injection amount by providing the slide extension member 810. Further, it is preferable that the slide extension member is provided on the inner diameter side from the fuel passage provided in the mover 102. This suppresses increment in the mass of the mover 102 with the slide extension member 810, accordingly, it is possible to suppress reduction of the responsiveness upon valve opening/closing.

Sixth Embodiment

Figure 13:
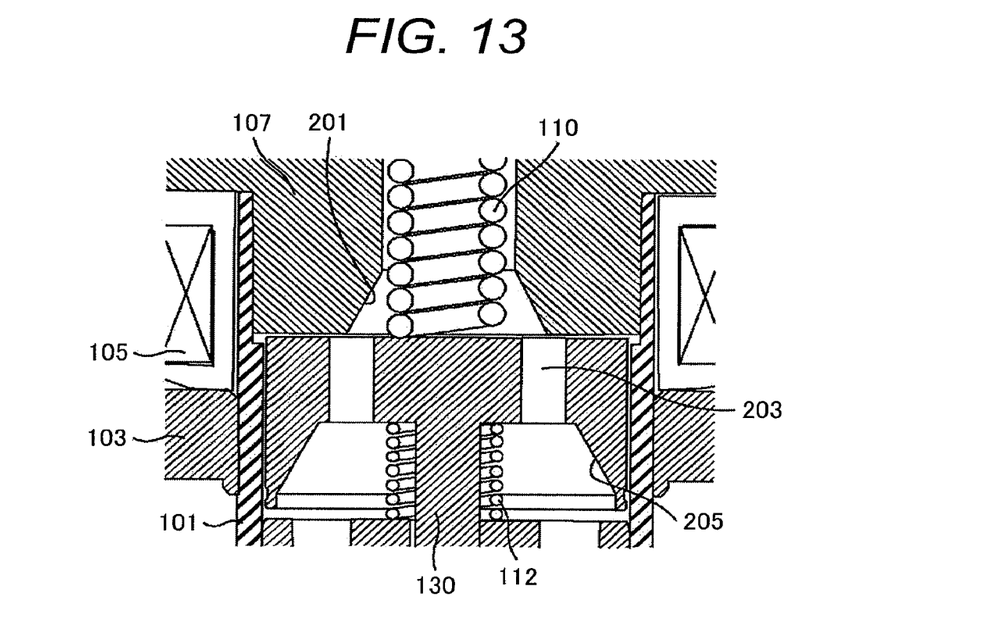
FIG. 13 is an enlarged view of the cross section of the driving unit in the fuel injection device in a sixth embodiment of the present invention.

A sixth embodiment according to the present invention will be described using FIG. 13. FIG. 13 is an enlarged view of the cross section of the driving unit in the fuel injection device in the sixth embodiment. Note that in FIG. 13, constituent elements the same as those in FIGS. 1 and 2 have the same reference numerals.

In the example shown in FIG. 13, in addition to the second embodiment, the mover 102 and the valve body 114 are formed with the same member. The mover 102 and the valve body 114 may be formed by combining separate members as long as the mover 102 and the valve body 114 are used as an integral member 130. It is possible to suppress the number of parts and reduce the costs by using the integral member 130. Further, in the structure where the mover 102 and the valve body 114 are separate members, upon vale closing, when the valve body 114 collides with the valve seat 118, the mover 102 moves away from the valve body 114, accordingly, the valve body 114 bounds by the collision between the valve body 114 and the valve seat 118, and the occurrence of secondary fuel injection is suppressed. On the other hand, when the valve body 114 collides with the valve seat 118, the mover 102 moves away from the valve body 114 and moves in the downward direction. Accordingly, time until the mover 102 stands still is prolonged. The time until the mover 102 stands still is changed in accordance with the mass of the mover 102, the speed of collision between the valve body 114 and the valve seat 118, the balance between the spring force of the zero spring 112 and the fluid force applied to the mover 102. When the next injection is performed before the mover 102 stands still, time from the start of operation of the valve body 114 to valve opening varies, and it is difficult to accurately manage the injection amount. According to the present embodiment, as the time from the collision between the valve body 114 with the valve seat 118 upon valve closing to the rest of the mover 102 can be reduced, the time by the next injection can be reduced, and the responsiveness is improved.

Seventh Embodiment

Figure 14:
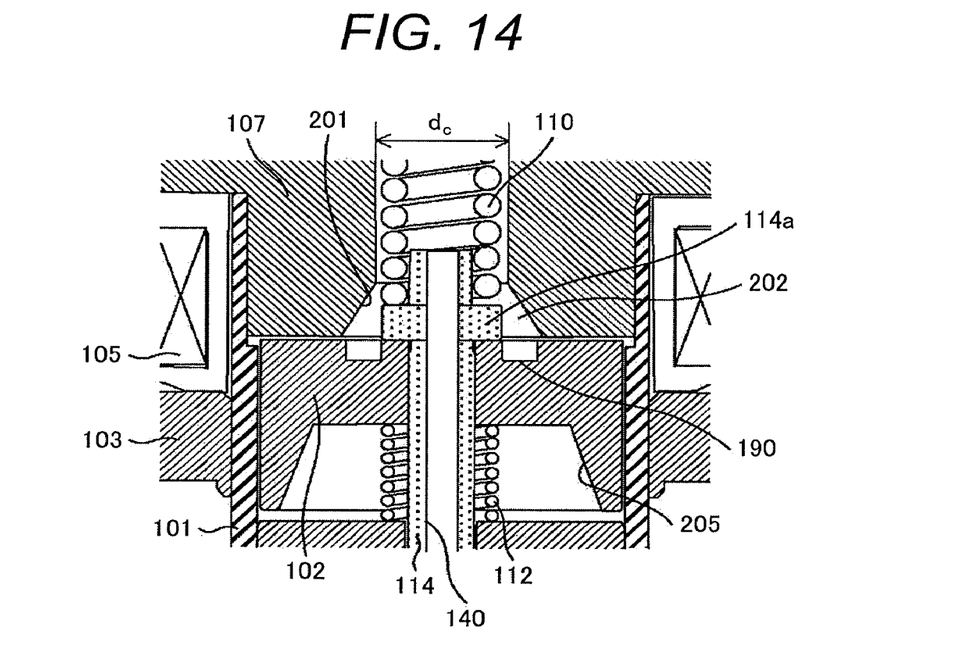
FIG. 14 is an enlarged view of the cross section of the driving unit in the fuel injection device in a seventh embodiment of the present invention.

Next, a seventh embodiment according to the present invention will be described using FIG. 14. FIG. 14 is an enlarged view of the cross section of the driving unit in the fuel injection device in the seventh embodiment. Note that in FIG. 14, constituent elements the same as those in FIGS. 1 and 2 have the same reference numerals.

In the example shown in FIG. 14, in addition to the second embodiment, a fuel passage central hole 140 as a fuel passage hole is provided in the valve body 114, and a groove 190 is provided in the end surface of the mover 102 on the magnetic core 107 side. The area of the end surface of the mover 102 on the magnetic core 107 side is reduced by providing the groove 190. Accordingly, the magnetic flux density of the attracting surface is increased, and the attraction force can be improved. Note that the groove 190 may be formed in e.g. a ring shape.

In the present embodiment, the fuel passage central hole 140 is provided in the central position of the valve body. With this arrangement, as it is not necessary to ensure a fuel passage between the magnetic core 107 and the valve body 114, it is possible to increase the cross-sectional area of the magnetic path of the magnetic core 107 and improve the attraction force. Further, as the mass of the valve body 114 is reduced, the impulsive force upon collision of the valve body 114 with the valve seat 118 in valve closing is reduced, and the bounce after the collision of the valve body 114 with the valve seat 118 is reduced, further, secondary fuel injection caused by the bounce is suppressed.

Eighth Embodiment

Figure 15:
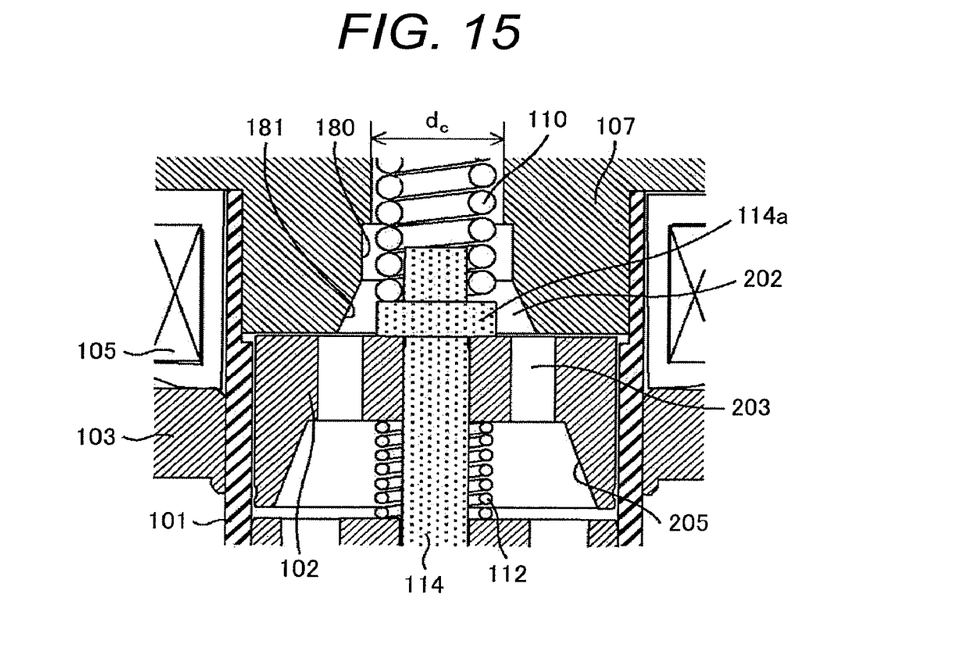
FIG. 15 is an enlarged view of the structure of the driving unit in the fuel injection device in an eighth embodiment of the present invention.

Next, an eighth embodiment according to the present invention will be described using FIG. 15. FIG. 15 is an enlarged view of the structure of the driving unit in the fuel injection device in the eighth embodiment. Note that in FIG. 15, the constituent elements the same as those in FIGS. 1 and 2 have the same reference numerals.

In the example shown in FIG. 15, in addition to the second embodiment, a large diameter part 180, in which the inner diameter is larger than an inner diameter $d_c$ of the magnetic core 107, is provided in an upstream part of a taper 181, provided for the purpose of reduction of the thickness of the inner diameter of the magnetic core 107. With this arrangement, it is possible to reduce the leakage of magnetic flux from the magnetic core 107 to the spring 110 and improve the attraction force. Further, since the fluid passage for fuel is formed between the magnetic core 107 and the valve body 114, it is advantageous that the fluid passage can be enlarged by providing the large diameter part 180.

Ninth Embodiment

Figure 16:
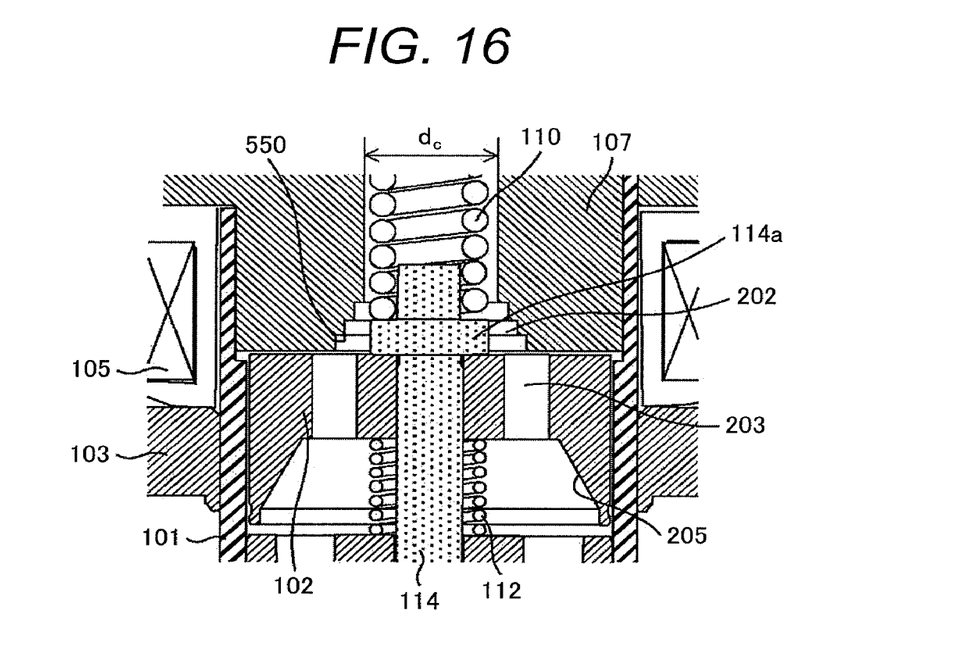
FIG. 16 is an enlarged view of the structure of the driving unit in the fuel injection device in a ninth embodiment of the present invention.

Next, a ninth embodiment according to the present invention will be described using FIG. 16. FIG. 16 is an enlarged view of the structure of the driving unit in the fuel injection device in the ninth embodiment. Note that in FIG. 16, constituent elements the same as those in FIGS. 1 and 2 have the same reference numerals.

In the example shown in FIG. 16, in addition to the second embodiment, an inner diameter enlarged part 550 is provided in the inner diameter of the magnetic core 107. In the present embodiment, the inner diameter enlarged part 550 has, not a simple tapered shape, but a step shape having at least two step surfaces. With this step shape, the same advantage as that obtained with the tapered shape can be obtained. Note that in the present embodiment, the step shape has three steps.

Tenth Embodiment

Figure 17:
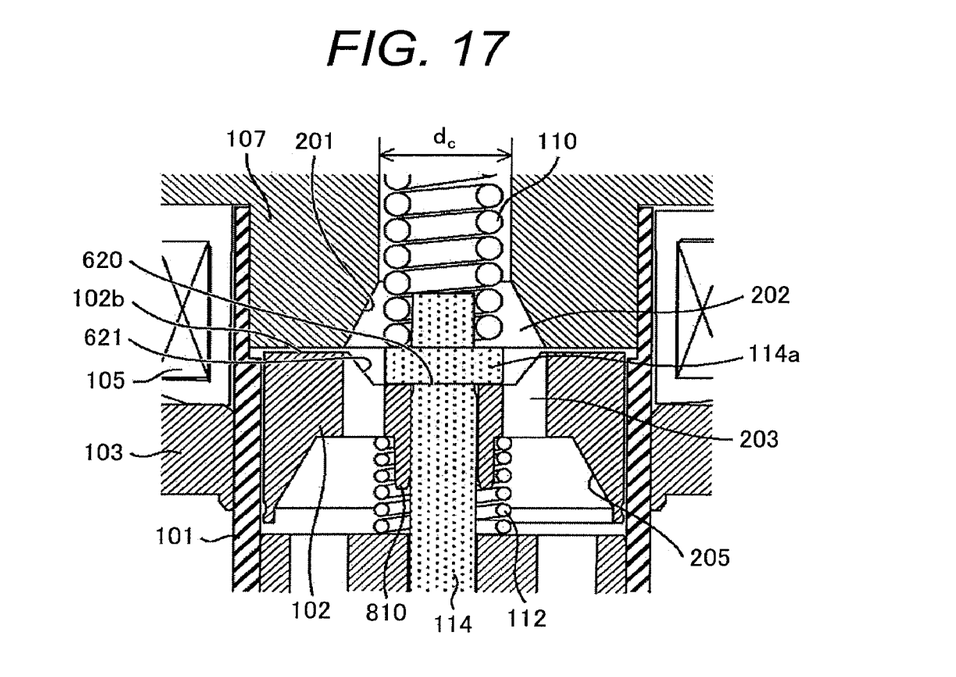
FIG. 17 is an enlarged view of the structure of the driving unit in the fuel injection device in a tenth embodiment of the present invention.

Next, a tenth embodiment according to the present invention will be described using FIG. 17. FIG. 17 is an enlarged view of the structure of the driving unit in the fuel injection device in the tenth embodiment. Note that in FIG. 17, constituent elements the same as those in FIGS. 1, 2 and 11 have the same reference numerals.

In the example shown in FIG. 17, in addition to the second embodiment, an intermediate surface 620 for transmission of a force with the valve body 114 and a slope 621 are provided in the mover 102. That is, the intermediate surface 620 forms a bottom surface of a concave part formed in an opposite surface 102*b* of the mover 102 with respect to the magnetic core 107. The slope 621 is formed as a plane connecting the intermediate surface 620 with the opposite surface 102*b*. With the slope 621, the area of the end surface of the mover 102 on the magnetic core 107 side is reduced, accordingly, the magnetic flux density of the attracting surface is increased, and the attraction force can be improved. Further, with the intermediate surface 620, the mass of the mover 102 is reduced, accordingly, the acceleration of the mover 102 upon valve opening/closing is increased, and the time required for valve opening can be reduced. Further, as the contact surface between the regulator 114*a* provided in the valve body 114 and the mover 102 is positioned below the upper end surface of the mover 102, the area of the fuel passage 202 provided between the magnetic core 107 and the valve body 114 is increased. Accordingly, as the cross-sectional area of the magnetic path of the magnetic core 107 is large, the magnetic attraction force is improved. Further, it is possible to set the position of the fuel passage hole 203 provided in the mover 102 on the inner diameter side by increasing the gap between the valve body 114 and the magnetic core 107. Accordingly, it is possible to suppress reduction of the cross-sectional area of the magnetic path of the mover 102 with the fuel passage hole 203 and improve the attraction force.

Further, in the present embodiment, the thickness of the mover 102 on the inner diameter side, positioned away from the coil 105, is reduced by providing the slope 621 in the mover 102. With this arrangement, when the supply of the electric current to the coil 105 is stopped from the current-supply state, it is possible to reduce the residual magnetic flux remaining on the inner diameter side of the mover 102, accordingly, it is possible to improve the responsiveness upon valve closing.

In this manner, when the intermediate surface 620 is provided, it is preferable that the mover 102 is provided with the slide extension part 810. When the intermediate surface 620 is provided, the slide length with respect to the valve body 114 is shortened, however, it is possible to ensure the slide length while suppressing increment in the mass of the mover 102 and suppress the inclination of the mover 102 by providing the slide extension part 810.

Further, it is preferable that in the magnetic core 107, the inner diameter enlarged part 201 is provided on the inner diameter side from the surface of the mover 102 opposite to the mover side end surface of the magnetic core 107. With this arrangement, as the distance between the inner diameter enlarged part 201 and the intermediate surface 620 of the mover 102 is increased, it is possible to efficiently flow the magnetic flux through the attracting surface of the magnetic core 107 and improve the attraction force.

The invention claimed is:

1. A fuel injection device comprising:
a valve body that comes into contact with a valve seat to close a fuel passage, and moves away from the valve seat to open the fuel passage in order to inject fuel through at least one injection orifice;
a mover that performs valve opening and closing operations in collaboration with the valve body, wherein the mover has a slope provided on an upper end surface of the mover and includes a through hole through which the valve body is inserted; and
a magnetic core that is excited by energization of a coil and that generates a magnetic force to drive the mover, wherein
the magnetic core has a hole that is opened in an end surface opposite to the mover and formed in a direction along a valve stem,
the hole has, provided on the mover side end surface of the magnetic core, a magnetic core inner diameter enlarged part in which an inner diameter is gradually enlarged from a back side of the hole toward the end surface opposite to the mover,
the magnetic core inner diameter enlarged part and the slope are located on an inner side of the magnetic core and an inner side of the mover, respectively,
in a region where the mover and the magnetic core face each other, the end of a face of the inner diameter enlarged part of the magnetic core and the end of an inner diameter side of a slope portion are provided at positions corresponding to each other, and
an interval between a surface where the magnetic core inner diameter enlarged part is formed and the slope of the mover in the direction along the valve stem is increased as the inner diameter of the inner diameter enlarged part becomes smaller.

2. The fuel injection device according to claim 1, wherein the magnetic core inner diameter enlarged part is provided within an inner diameter of the mover end surface that is opposite to the end surface of the magnetic core.

3. The fuel injection device according to claim 2, wherein the slope is provided within an inner diameter of the magnetic core end surface that is opposite to the end surface of the mover.

4. The fuel injection device according to claim 2, wherein the magnetic core inner diameter enlarged part and the slope face each other.

5. The fuel injection device according to claim 2, wherein the magnetic core end surface and the mover end surface are horizontally arranged and parallel to each other.

6. The fuel injection device according to claim 2, wherein, in an axial cross-section, virtual connecting points between the magnetic core end surface and the surface of the magnetic core inner diameter enlarged part, and between the mover end surface and the surface of the slope are arranged, substantially, on a same virtual vertical line.

7. The fuel injection device according to claim 2, wherein the mover has a fuel passage hole communicating from an upper end surface of the mover facing to the magnetic core toward a downstream side.

8. The fuel injection device according to claim 7, wherein a central position of the fuel passage hole in the mover is on an inner diameter side from an inner diameter of the end surface of the magnetic core.

9. The fuel injection device according to claim 2, wherein the mover has a second inner diameter enlarged part, in which an inner diameter is gradually enlarged from an upstream side toward an downstream side, and
a start point of the second inner diameter enlarged part provided in the mover is positioned on an outer diameter side from an inner diameter of the end surface of the magnetic core.

10. The fuel injection device according to claim 1, wherein the slope is provided within an inner diameter of the magnetic core end surface that is opposite to the end surface of the mover.

11. The fuel injection device according to claim 1, wherein the magnetic core inner diameter enlarged part and the slope face each other.

12. The fuel injection device according to claim 11, wherein the slope is provided within an inner diameter of the magnetic core end surface that is opposite to the end surface of the mover.

13. The fuel injection device according to claim 11, wherein the magnetic core end surface and the mover end surface are horizontally arranged and parallel to each other.

14. The fuel injection device according to claim 11, wherein, in an axial cross-section, virtual connecting points between the magnetic core end surface and the surface of the magnetic core inner diameter enlarged part, and between the mover end surface and the surface of the slope are arranged, substantially, on a same virtual vertical line.

15. The fuel injection device according to claim 1, wherein the magnetic core end surface and the mover end surface are horizontally arranged and parallel to each other.

16. The fuel injection device according to claim 15, wherein the magnetic core inner diameter enlarged part and the slope face each other.

17. The fuel injection device according to claim 1, wherein, in an axial cross-section, virtual connecting points between the magnetic core end surface and the surface of the magnetic core inner diameter enlarged part, and between the mover end surface and the surface of the slope are arranged, substantially, on a same virtual vertical line.

18. The fuel injection device according to claim 1, wherein the mover has a fuel passage hole communicating from an upper end surface of the mover facing to the magnetic core toward a downstream side.

19. The fuel injection device according to claim 18, wherein a central position of the fuel passage hole in the mover is on an inner diameter side from an inner diameter of the end surface of the magnetic core.

20. The fuel injection device according to claim 1, wherein the mover has a second inner diameter enlarged part, in which an inner diameter is gradually enlarged from an upstream side toward an downstream side, and
a start point of the second inner diameter enlarged part provided in the mover is positioned on an outer diameter side from an inner diameter of the end surface of the magnetic core.

* * * * *